United States Patent [19]

Ferruti et al.

[11] Patent Number: 4,769,388

[45] Date of Patent: Sep. 6, 1988

[54] POLYCONDENSATION PRODUCTS BETWEEN 1,10-BIS(2-HYDROXYETHYLTHIO)DECANE, POLY(OXYETHYLENE GLYCOL)S OR POLY(OXYPROPYLENEGLYCOL)S, AND BIS(CARBOXYLIC ACID)S

[75] Inventors: Paolo Ferruti; Giancarlo Scapini, both of Rome, Italy

[73] Assignee: Nuovo Consorzio Sanitario Nazionale, Rome, Italy

[21] Appl. No.: 894,011

[22] Filed: Aug. 7, 1986

Related U.S. Application Data

[63] Continuation-in-part of Ser. No. 701,999, Feb. 15, 1985, abandoned.

[30] Foreign Application Priority Data

Feb. 17, 1984 [IT] Italy .............................. 19682 A/84

[51] Int. Cl.[4] ................... A61K 31/225; C08G 63/02; C07C 69/34; C07C 67/08
[52] U.S. Cl. .................................... 514/547; 514/529; 514/530; 528/272; 528/294; 560/122; 560/127; 560/195; 560/204

[58] Field of Search ...................... 560/80, 87, 94, 98, 560/122, 123, 124, 127, 195, 204; 514/530, 529, 547; 528/272, 294

[56] References Cited

U.S. PATENT DOCUMENTS

| | | | |
|---|---|---|---|
| 2,356,586 | 8/1944 | Hentrich et al. | 560/195 X |
| 2,439,212 | 4/1948 | Jacobson | 560/195 X |
| 2,626,924 | 1/1953 | DeGroote | 560/195 X |
| 3,541,138 | 11/1970 | Emmons et al. | 560/195 |

FOREIGN PATENT DOCUMENTS

49-41339 11/1974 Japan .

Primary Examiner—Werren B. Lone
Assistant Examiner—Vera C. Clarke
Attorney, Agent, or Firm—Birch, Stewart, Kolasch & Birch

[57] ABSTRACT

A new series of oligomeric or polymeric compounds having a poly(ester) structure, wherein the monomeric starting materials are 1,10-bis(2-hydroxyethylthio)decane, poly(oxyethyleneglycol)s or poly(oxypropyleneglycol)s and carboxylic acids, the process for the preparation thereof and the therapeutic use thereof.

13 Claims, No Drawings

POLYCONDENSATION PRODUCTS BETWEEN 1,10-BIS(2-HYDROXYETHYLTHIO)DECANE, POLY(OXYETHYLENE GLYCOL)S OR POLY(OXYPROPYLENEGLYCOL)S, AND BIS(CARBOXYLIC ACID)S

This application is a continuation-in-part of application Ser. No. 701,999 filed on Feb. 15, 1985, now abandoned, which is hereby incorporated by reference.

The present invention refers to a new series of copolymeric poly(ester)s having the following structure:

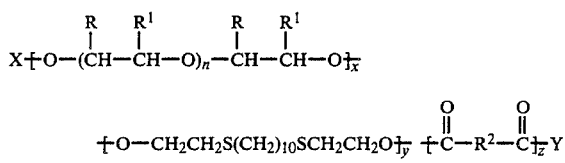

wherein the meanings of n, x, y, z, R, $R^1$, $R^2$, X, Y are the following:
  n is an integer ranging from 0 to 100;
  x and y are integers ranging from 1 to 100;
  z is an integer equal to $(x+y)$;
  R and $R^1$ may be either H or $CH_3$, with the exclusion of the case in which both are $CH_3$;
  $R^2$ is a $C_1$-$C_4$ alkylene chain, linear or branched, a saturated or unsaturated $C_1$-$C_4$ alkylene chain or a $C_5$-$C_7$ cycloalkylene residue;
  X may be either H or

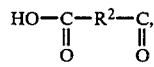

where $R^2$ is the same as described above; and
  Y may be OH, or O—$CH_2CH_2$—S—$(CH_2)_{10}$—S—$CH_2CH_2$—OH, or

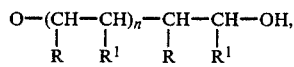

where n, R and $R^1$ are the same as described above.

A further definition of the above formula is, that each unit labelled z is preceeded and followed by a unit labelled x or y; each unit labelled z or y is preceeded and followed by a unit labelled z; but in no case a unit labelled x may be preceeded or followed by a unit labelled y, and vice-versa. The distribution of units labelled x and y with regard each other along the polymeric chain may be either random, or alternating, according to the synthetic method employed.

Thus, the present invention relates to a series of new oligomeric or polymeric products having a poly(ester) structure, in which Thiadenol, poly(oxyethyleneglycol)s or poly(oxypropyleneglycol)s, and dicarboxylic acids are the starting monomeric materials.

It is well known that 1,10-bis(2-hydroxyethylthio)decane, commonly marketed as Thiadenol, is a widely used hypolipemizing drug, active in several types of dislipidemy. This drug, however, has some serious drawbacks, which are mainly related to a too fast rate of metabolism and excretion. Large daily doses, and repeated administrations are usually needed, the recommended treatment usually involving three 0.8 g administrations a day, totalling 2.4 g. This daily dose may be reduced after some time to about 1.8 g/day. Such large doses often induce gastric pains, nausea, and vomit. Thiadenol is not recommended when the patient has a previous record of gastritis, or gastric or duodenal ulcera.

The object of the present invention is to overcome most of the above drawbacks connected with the use of free Thiadenol.

It may be observed that in the above products the active principle is bound to a polymeric structure by ester bonds. This may ensure a gradual release of the drug into the body fluids, since ester bonds can be hydrolyzed in biological environments. This can lead to a more prolonged activity, and unfavorable side-effects due to hyperdosage can be minimized.

The introduction of poly(oxyethyleneglycol) or poly(oxypropyleneglycol) moieties is of advantage for the following reasons:

(1) it imparts to the polycondensates a degree of hydrophilicity which facilitates the hydrolysis of the ester bonds; and (2) in the case of low molecular weight polymer, it facilitates the adsorption through the gastrointestinal tract.

The synthesis of the above polymers may be performed by heating a mixture of 1,10-bis(2-hydroxyethylthio)decane and a poly(oxyethyleneglycol) or poly(oxypropyleneglycol) with a bis-carboxylic acid, preferably in the presence of a suitable catalyst, and eliminating water which is formed as polyesterification proceeds.

Instead of the free acids, reactive derivatives of the same acids can be employed, such as for instance their anhydrides, chlorides, or reactive esters and amides (imidazolides, benzotriazoles and the like). By this way, random copolymers can be obtained (see above).

Another way to obtain the title polymers, leading to products in which Thiadenol-deriving groups and poly(oxyethyleneglycol) or poly(oxypropyleneglycol) groups alternate along the polymeric chain, is the following. First of all, a hemiester of poly(oxyethyleneglycol) or poly(oxypropyleneglycol) with a bis-acid is prepared, according to known methods (see e.g.: P. Ferruti et al., Makromoleculare Chemie, vol. 182, pag. 2183, 1981; L. Rusconic, M. C. Tan zi, C. Zambelli, P. Ferruti, Polymer, Vol. 23, pag. 1689, 1982).

Thereafter a reactive derivative of the same is prepared, which is finally reacted with Thiadenol, according to the following Scheme, in which imidazolides are choosen as reactive derivatives:

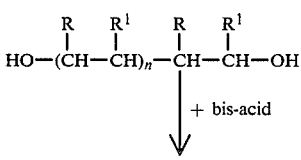

-continued

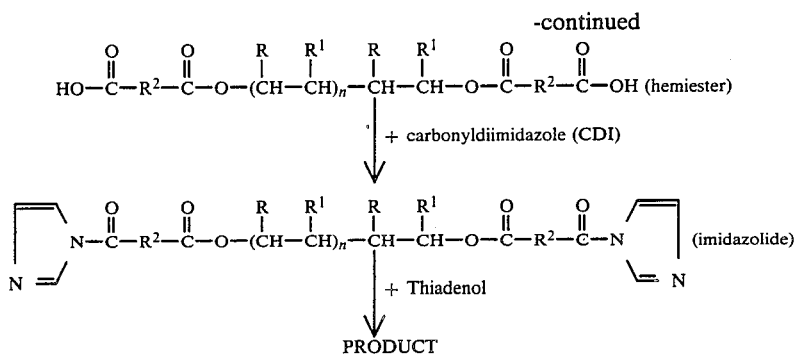

Alternatively, starting from Thiadenol, the hemiester may be prepared, from which the bis-imidazolide is subsequently obtained, which is finally treated with an excess of poly(oxyethyleneglycol) or poly(oxypropyleneglycol).

As far as the dicarboxylic acids are concerned, any aliphatic, cycloaliphatic, aromatic, and heterocyclic dicarboxylic acid can be used, as it is apparent to every experienced organic chemist, provided no other chemical functions are present which are able to interfere in the polycondensation process. Usually, however, we preferred to use, as monomers, bis-acids which are commonly found in living organisms, such as for instance succinic acid, glutaric acid, adipic acid, sebacic acid, and the like, in order to avoid the production of toxic fragments after the hydrolytic breakdown of the polymeric product in the body fluids. In this respect, it may be worthy to mention that poly(oxyethyleneglycol)s and poly(oxypropyleneglycol)s, also introduced as co-monomers, are known to have a very reduced toxicity, and are commonly used in syrups and other pharmaceutical compositions.

The acute toxicity of the products, in all the tested cases, was found to be very low. Their $LD_{50}$ in rats, and rabbits, could be hardly determined, in any case being higher than 1,000 mg/kg.

The compounds of the invention are useful for the treatment of hypertriglyceridemias, hypercholesterolemias and mixed hyperlipidemias. Low-density-lipoproteins and very low density lipoproteins are reduced and cholesterol and triglycerides blood levels are lowered. When equal doses of thiadenol and of the compounds of the invention are administered to experimental animals and to humans, the drugs blood levels are longer-lasting in the case of compounds of the invention.

This involve a longer duration of action and the possibility to reduce the administration frequency, up to once a day.

For the pharmaceutical use, the compounds of the invention can be prepared and administered in a wide variety of oral, and parenteral dosage froms.

For preparing pharmaceutical compositions from the compounds described by this invention, inert, pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet disintegrating agents; it can also be an encapsulating material. Suitable solid carriers are magnesium carbonate, magnesium stearate, talc, sugar, lactose, pecitn, dextrin, starch, gelatin, tragacanth, methyl cellulose, sodium carboxymethyl cellulose, a low melting wax, cocoa butter, and the like.

Liquid form preparations include solutions, suspensions, and emulsions. As an example may be mentioned water or water-propylene glycol solutions for parenteral injection. Liquid preparations can also be formulated in solution in aqueous polyethylene glycol solution. Aqueous solutions suitable for oral use can be prepared by dissolving the active component in water and adding suitable colorants, flavors, stabilizing, and thickening agents as desired. Aqueous suspensions suitable for oral use cn be made by dispersing the finely divided active component in water with viscous material, i.e., natural or synthetic gums, resins, methyl cellulose, sodium carboxymethyl cellulose, and other well-known suspending agents.

Preferably, the pharmaceutical preparation is in unit dosage form. In such form, the preparation is subdivided into unit doses containing appropriate quantities of the active component. The unit dosage form can be a packaged preparation, the package containing discrete quantities of preparation, for example, packeted tablets, capsules, and powders in vials or ampoules. The unit dosage form can also be a capsule, cachet, or tablet itself or it can be the appropriate number of any of these packaged form.

The quantity of active compound in a unit dose of preparation may be varied or adjusted from 50 mg to 1000 mg.

In therapeutic use the compounds of this invention are administered at the initial dosage of about 0.1 mg to about 50 mg per kilogram. A dose range of about 10 mg to about 30 mg per kilogram is preferred. The dosages, however, may be varied depending upon the requirements of the patient, the severity of the condition being treated, and the compound being employed. Determination of the proper dosage for a particular situation is within the skill of the art.

In order to better elucidate the above disclosure, the following non-limitative Examples are given by way of illustration.

EXAMPLE 1

Glutaric anhydride (10.42 g, 0.09 mole), 1,10-bis(2-hydroxyethylthio)decane (i.e. thiadenol, 17.67 g, 0.06 mole), triethyleneglycol (9.01 g, 0.06 mole), and toluene (500 ml) were charged into a 1 liter flask equipped with a Sohlet apparatus filled with a suitable dehydrating agent (silica or calcium sulfate). 4-Toluenesulfonic acid (1.0 g) was added as the catalyst, and the mixture was refluxed for 48 hrs, the water formed during esterification being continuously removed with toluene, and captured by the dehydrating agent while passing through the Soxhlet apparatus.

After this time, the reaction mixture was treated with decolorizing carbon (3 g), filtered, and evaporated to dryness "in vacuo". The residue was then treated with methanol (200 ml), refluxed 2 m, cooled to 0° C., and decanted. This treatment was repeated three times. The final residue was dried to constant weight at 90° C. and 0.1 Tor. Yield 17.5 g.

The product was a 70/30 mixture of two polymers, the first of which (A) contained for each molecule 3 glutaric anhydride moieties, 3 Thiadenol moieties, and 1 triethyleneglycol moiety, while the other one (B) contained 3 glutaric anhydride moieties, 3 triethyleneglycol moieties, and 1 Thiadenol moiety. The average molecular weight of this mixture is 1262; found (by vapor pressure osmometry) 1277.

Analysis: calculated C 57.55%, H 84.5%; found C 57.50%, H 8.66%.

$^1$H-NMR spectroscopy gave results in full agreement with the above structure. The two compounds could be separated by normal fractionation techniques, using toluene as the solvent, and methanol as the nonsolvent.

It may be noticed that product A corresponds to the general formula given in the text, where n=2, x=1, y=3, z=3, R=R$^1$=H, R$^2$=—(CH$_2$)$_3$—, X=H, U=—O—CH$_2$CH$_2$—S—(CH$_2$)$_{10}$—S—CH$_2$CH$_2$—OH; while in product B n=2, x=3, y=1, z=3, R=R$^1$=H, R$^2$=—(CH$_2$)$_3$—, X=H, Y=

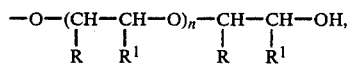

where R, R$^1$, and n have the same meanings as above.

EXAMPLE 2

The same procedure as in Example 1 was followed, by substituting adipic acid (0.09 mole) and poly(-propyleneglycol) having molecular weight 400 (0.06 mole) for equimolecular quantities of glutaric anhydride and triethyleneglycol. The raw product was isolated in the same way, to yield 24 g. It was a 75/25 mixture of two products (A and B), which could be separated by fractionation as indicated above. Product A corresponds to the formula of the Text, where n=6, x=1, y=2, z=3, R=H, R$^1$=CH$_3$ (or vice-versa, R=CH$_3$ and R$^1$=H) R$^2$=—(CH$_2$)$_4$—, X=H, Y=—O—CH$_2$CH$_2$—S—(CH$_2$)$_{10}$—S—CH$_2$CH$_2$—OH; while in product B n=6, x=2, y=1, z=3, R=H, R$^1$=CH$_3$ (or vice-versa, R=CH$_3$ and R$^1$=H), R$^2$=—(CH$_2$)$_4$—, X=H, Y=

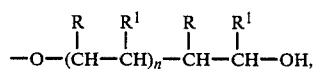

where, as usual, R, R$^1$, and n are the same as above.

EXAMPLE 3

The same procedure as in Example 1 was followed, by substituting tetraethyleneglycol (0.06 mole) for an equimolecular quantity of triethyleneglycol. Yield 21 g. The product was a 70/30 mixture of two products A and B, having the same structures of products A and B of Example 1, apart form the meaning of n, which is 3 instead of 2.

EXAMPLE 4

Poly(oxyethyleneglycol) hemisuccinate (obtained starting from poly(oxyethyleneglycol) of molecular weight 1000, for instance as described in P. Ferruti et al., Makromoleculare Chemie, Vol. 182, pag. 2183, 1981), (12 g, 0.01 mole), was dissolved in anhydrous, alcohol-free chlorofrom (100 ml). N,N'-carbonyl-diimidazole (1.62 g, 0.01 mole) was added, and the mixture stirred at room temperature for 30'. 1,10Bis(2-hydroxyethylthio)decane (3.234 g, 0.011 mole) was then added, and the mixture was maintained at 60° C. for 48 hrs. Great care must be exercised to exclude moisture at every stage of the process. After this time, the reaction mixture was diluted with chloroform (200 ml), and extracted with 3×100 ml portions of 0.5M aq. hydrochloric acid, then with 3×100 ml portions of water. The organic layer was finally dried (Na$_2$SO$_4$), evaporated in vacuo to one-fourth of its original volume, and poured into 400 ml of ether. The product was decanted, and dried to constant weight at 50° C. and 0.1 Torr. Yield 13.6 g. All analytical data agreed with a structure corresponding to the general formula of the Text, in which n=21, x=9, y=9, z=18, R=R$^1$=H, R$^2$=—(CH$_2$)$_2$—, X=H, Y=—O—CH$_2$CH$_2$—S—(CH$_2$)$_{10}$—S—CH$_2$CH$_2$—OH, and in which the units x and y are alternating along the macromolecular chain, being connected by succinoyl moieties.

Further scope of applicability of the present invention may become apparent from the detailed description given hereinabove. However, it should be understood that the detailed description and specific examples, while indicating preferred embodiments of the invention, are given by way of illustration only, since various changes and modifications within the spirit and scope of the invention will become apparent to those skilled in the art from this detailed description.

We claim:

1. An oligomeric or polymeric compound of formula

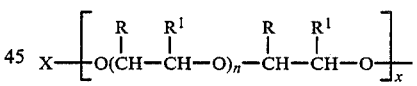

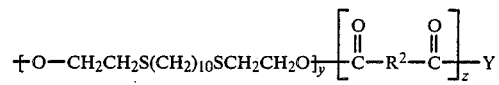

wherein:
n is an integer ranging from 0 to 100;
x and y are integers ranging from 1 to 100;
z is an integer equal to (x+y);
R and R$^1$ may be either H or CH$_3$, with the exclusion of the case in which both are CH$_3$;
R$^2$ is linear or branched C$_1$-C$_4$ alkylene chain or a C$_5$-C$_7$ cycloalkylene residue;
X may be either H or

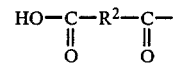

and
Y may be —OH, or —O—CH$_2$CH$_2$—S—(CH$_2$)$_{10}$—S—CH$_2$CH$_2$—OH, or

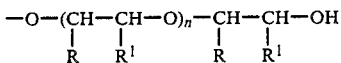

2. The compound according to claim 1, wherein $R^2$ is $-(CH_2)_2-$, $-(CH_2)_3-$, $-(CH_2)_4-$.

3. The oligomeric compound of claim 1, wherein n=2, x=1, y=3, z=3, $R=R^1=H$, $R^2=-(CH_2)_3-$, X=H, Y=$-O-CH_2CH_2-S-(CH_2)_{10}-S-CH_2CH_2-OH$.

4. The compound according to claim 1, wherein each unit labeled z is preceded and followed by a unit labeled x or y; or each unit labeled z or y is preceded and followed by a unit labeled z; with the proviso that no unit labeled x may be preceded or followed by a unit labeled y and no unit labeled y may be preceded or followed by a unit labeled x.

5. A process for the preparation of the compound according to claim 1, comprising reacting 1,10bis(2-hydroxyethylthio)decane and poly(oxyethyleneglycol)s or poly(oxypropyleneglycol)s or mixtures thereof with dicarboxylic acid reactive derivatives in the form of anhydrides, imidazolides, or chlorides.

6. A process for the preparation of the compound according to claim 1, comprising reacting bis-hemiester of poly(oxyethyleneglycol) or poly(oxypropyleneglycol) with a dicarboxylic acid, activating the residual carboxylic groups of the derivatives thereof; and reacting said reactive derivatives with 1,10bis(2-hydroxyethylthio)decane.

7. A process for the preparation of the compound according to claim 2, comprising:

reacting bis-hemiester of poly(oxyethyleneglycol) or poly(oxypropyleneglycol) with a dicarboxylic acid;

activating the residual carboxylic groups of the derivatives thereof; and reacting said reactive derivatives with 1,10-bis(2-hydroxyethylthio)decane.

8. A process for the preparation of the compound according to claim 1, comprising:

reacting a mixture of 1,10-bis(2-hydroxyethylthio)decane and poly(oxyethyleneglycol) or poly(oxypropyleneglycol) with a biscarboxylic acid in the presence of a catalsyt; and eliminating water which is formed as polyesterification proceeds.

9. A pharmaceutical composition having hypolipemizing activity comprising 50 to 1000 mg of a compound according to claim 1 as the active ingredient in admixture with a suitable carrier.

10. A pharmaceutical composition having hypolipemizing activity comprising 50 to 1000 mg of a compound according to claim 2 as the active ingredient in admixture with a suitable carrier.

11. A pharmaceutical composition for the treatment of hypertriglyceridemias, hypercholesterolamias and mixed hyperlipidemias, comprising an effective amount of a compound according to claim 1 as the active ingredient and a suitable carrier therefor.

12. A method for treating hypertriglyceridemias, hypercholesterolemias and mixed hyperlipidemias comprising administering an effective amount of a compound according to claim 1 to a patient.

13. The method according to claim 12, wherein an initial dosage is about 0.1 mg to 50 mg per kilogram.

* * * * *